United States Patent
Scaglione et al.

(10) Patent No.: US 7,493,080 B2
(45) Date of Patent: Feb. 17, 2009

(54) METHODS AND SYSTEMS FOR COOPERATIVE TRANSMISSION IN MULTI-HOP AD-HOC NETWORKS

(75) Inventors: Anna Scaglione, Ithaca, NY (US); Yao-Win Hong, Ithaca, NY (US)

(73) Assignee: Cornell Research Foundation, Inc., Ithaca, NY (US)

( * ) Notice: Subject to any disclaimer, the term of this patent is extended or adjusted under 35 U.S.C. 154(b) by 829 days.

(21) Appl. No.: 10/946,439

(22) Filed: Sep. 21, 2004

(65) Prior Publication Data
US 2005/0113084 A1 May 26, 2005

Related U.S. Application Data

(60) Provisional application No. 60/504,845, filed on Sep. 22, 2003.

(51) Int. Cl.
| | |
|---|---|
| H04B 1/60 | (2006.01) |
| H04B 17/02 | (2006.01) |
| H04B 1/10 | (2006.01) |
| H04B 7/00 | (2006.01) |
| H04L 1/02 | (2006.01) |
| H04N 7/12 | (2006.01) |

(52) U.S. Cl. .......................... 455/9; 455/702; 375/267; 375/240.27

(58) Field of Classification Search ............... 455/9, 455/702; 375/267, 240.27
See application file for complete search history.

(56) References Cited

U.S. PATENT DOCUMENTS

| | | | | |
|---|---|---|---|---|
| 5,274,844 A | * | 12/1993 | Harrison et al. | ............... 455/25 |
| 6,304,556 B1 | * | 10/2001 | Haas | ............... 370/254 |
| 6,415,330 B1 | * | 7/2002 | Okanoue | ............... 709/245 |
| 6,614,861 B1 | * | 9/2003 | Terry et al. | ............... 375/347 |
| 6,665,521 B1 | * | 12/2003 | Gorday et al. | ............... 455/67.11 |
| 6,816,710 B2 | * | 11/2004 | Krasner | ............... 455/73 |
| 7,310,378 B2 | * | 12/2007 | Mege et al. | ............... 375/240.27 |
| 2005/0047517 A1 | * | 3/2005 | Georgios et al. | ............... 375/267 |

(Continued)

OTHER PUBLICATIONS

Lee, Ho-Kyoung and Kim, Kiseon, Pairwise Error Probability Evaluation of Multiple Symbol Trellis-Coded Continuous Phase Frequency Shift Keying in a Slow Fading Channel, IEEE Communications Letters, vol. 6, No. 9, Sep. 2002.*

(Continued)

*Primary Examiner*—Matthew D Anderson
*Assistant Examiner*—Bobbak Safaipour
(74) *Attorney, Agent, or Firm*—Burns & Levinson LLP; Jacob N. Erlich; Orlando Lopez

(57) ABSTRACT

Methods and systems that enable a cooperative form of transmission performed by a set of asynchronous transceivers operating as a distributed joint communication system. In an embodiment of the method of this invention, information is transmitted from one or more predetermined nodes (the source nodes) in the network. The information is received at the other nodes (the receiving nodes) in the network. For every information symbol/codeword each of the receiving nodes receives an accumulation of signals from nodes transmitting an earlier stage. At each of the receiving nodes a predetermined criterion is utilized to decide whether to retransmit the received information. If retransmission is indicated, the signal modulating the information symbol is retransmitted from the receiving nodes and delivered to an increasing number of downstream nodes.

36 Claims, 9 Drawing Sheets

U.S. PATENT DOCUMENTS

2005/0143026 A1*  6/2005  Bellantoni .................. 455/121
2007/0142011 A1*  6/2007  Shatara ...................... 455/222

OTHER PUBLICATIONS

Scaglione A. et al. (Aug. 2003) "Opportunistic Large Arrays: Cooperative Transmission in Wireless Multihop Ad hoc networks to reach far distances." IEEE Transactions on Signal Processing, 51(8) 2082-92 (copy as submitted to IEEE).

Viswanath, P. et al. (Jun. 2002) "Opportunistic Beamforming Using Dumb Antennas." IEEE Transactions on Information Theory, 48(6) 1277-94.

Hasna, M.O. et al. (Nov. 2003) "End-to-End Performance of Transmission Systems With Relays Over Rayleigh-Fading Channels." IEEE Transactions on Wireless Communications, 2(6) 1126-31.

U.S. Appl. No. 60/504,845 filed Sep. 22, 2003. Applicants: Anna Scaglione et al. Title: Methods and Systems for Cooperative Transmission in Multi-Hop Ad-Hoc Networks.

* cited by examiner

METHODS AND SYSTEMS FOR COOPERATIVE TRANSMISSION IN MULTI-HOP AD-HOC NETWORKS

CROSS REFERENCE TO RELATED APPLICATIONS

This application claims priority of U.S. Provisional Application No. 60/504,845 filed on Sep. 22, 2003, which is herein incorporated by reference.

STATEMENT OF GOVERNMENT INTEREST

This invention was made partially with U.S. Government support from the National Science Foundation under grant CCR-0227676 and ONR Contract N00014-00-1-0564. The U.S. Government has certain rights in the invention.

BACKGROUND OF THE INVENTION

This invention relates generally to wireless networks, and, more particularly, to methods and systems for cooperative transmission in multi-hop ad-hoc networks.

An ad-hoc network architecture is a network that can be deployed rapidly and without relying on preexisting fixed network infrastructure. Personal communications and mobile computing require a wireless network infrastructure that is fast deployable, possibly multi-hop, and such an infrastructure is provided by multi-hop ad-hoc networks.

Since the first appearance of wireless ad hoc networks as the DARPA packet radio networks in the 1970s, wireless ad hoc networks have been the subject of research and development and have been considered for a number of applications. Proposed applications of wireless ad hoc networks include, but are not limited to:

tactical operation—for fast establishment of communication infrastructure during force deployment in unknown and hostile terrain;

rescue missions—for communication in areas without adequate wireless coverage;

national security—for communication in times of national crisis, where the existing communication infrastructure is non-operational due to a natural disaster or a global war;

law enforcement—for fast establishment of communication infrastructure during law enforcement operations;

commercial use—for setting up communication in exhibitions, conferences, or sale presentations;

education—for operation of wall-free (virtual) classrooms; and sensor networks—for communication between intelligent sensors mounted on mobile platforms.

However, multi-hop network protocols are presently designed using the paradigm of packet Networks and of point to point communications. Messages are delivered by going through a series of intermediate nodes through point to point links forming a routing path. In many applications of ad-hoc networks the medium is broadcast; therefore to attain point to point communications it is necessary to perform a Multiple Access protocol and resolve the contention in using the medium. Once the access is granted to a source and destination pair, the Physical Layer functions (source/channel coding) that pertain to each link are done locally. There is a need for a cooperative form of transmission performed by a set of asynchronous transceivers operating as a distributed joint communication system.

The nodes in ad-hoc networks are generally designed with low power transmitters whose power often not sufficient for communication towards distant receivers. This problem is often referred to as the reach back problem in military applications and could have an important role in more general sensor network applications.

The trademark of the reach-back problem is that the information from an arbitrary network node cannot be forwarded to a receiver that does not have a relay node in its vicinity without quickly draining its energy resources. The reach back point is "disconnected" since there is no point to point link that can be established towards it. Surprisingly, even though it appears to be a very concrete problem, the reach back problem has not received a critical mass of attention. There is a need for methods and systems that provide means for communicating with distant receivers, that is, solutions to the reach back problem.

SUMMARY OF THE INVENTION

Methods and systems that enable a cooperative form of transmission performed by a set of asynchronous transceivers operating as a distributed joint communication system are disclosed.

In an embodiment of the method of this invention, information is transmitted from one or more predetermined nodes (the source nodes) in the network. The information is received at the other nodes (the receiving nodes) in the network. For every information symbol/codeword each of the receiving nodes receives an accumulation of signals from nodes transmitting an earlier stage. At each of the receiving nodes a predetermined criterion is utilized to decide whether to retransmit the received information. If retransmission is indicated, the signal modulating the information symbol is retransmitted from the receiving nodes and delivered to an increasing number of downstream nodes. The accumulation of signals from this chain of retransmissions forms a network signature waveform that embeds the information data as well as the transmission power of multiple sources. This is equivalent to a distributed modulation system, where multiple points communicate to various destinations simultaneously.

In the system (network) of this invention, the transmission of the information in the network is led by one or more predetermined source nodes in the network. All the other nodes form multiple stages of relays to either flood the network with the information from the source, or just to pass the information to a remote receiver. The receiving nodes have a choice of whether to relay or not, depending on a predetermined criterion at that node.

The receiving nodes have the choice of retransmitting the received symbol or to stay silent. In one embodiment, in the regenerative scheme, only nodes whose maximum pair-wise symbol error probability (not considering error propagation) is below a pre-selected upper-bound actively reply. In another embodiment, only nodes whose SNR is above a fixed threshold actively reply.

In one embodiment, the transmitted signal is linearly modulated. In another embodiment, the modulation of the transmitted signal produces orthogonal signals. In a further embodiment, a modulation method of this invention, Leader Position Modulation, is used. The optimum maximum likelihood (ML) receiver of this invention is adapted to the transmission environment of this invention.

An embodiment of the method and system of this invention enables communicating with distance receivers (that is, presents a solution to the reach back problem).

An embodiment of the method of this invention is a physical layer flooding algorithm, which results in a network, that implements that embodiment of the method, which does not require the routing and multiple access overheads. ("Physical layer" is used herein in the same manner as used in computer networks and in the ISO model. See, for example, A. Tannenbaum, Computer Networks, ISBN 0-13-165183-8, 1981, pp. 10-16.)

In embodiments of this invention that adopt incoherent schemes such as OOK or FSK, the receivers are simply energy detectors and only symbol synchronization is required, but not training.

For a better understanding of the present invention, together with other and further objects thereof, reference is made to the accompanying drawings and detailed description, and its scope will be pointed out in the appended claims.

BRIEF DESCRIPTION OF THE DRAWINGS

FIG. 3 is a graphical schematic representation of the signal received at each receiving node of the system shown in FIG. 2a;

FIG. 5 is a graphical schematic representation of the signal received at each receiving node of a regenerative embodiment of the system shown in FIG. 2a;

DETAILED DESCRIPTION OF THE INVENTION

Methods and systems that enable a cooperative form of transmission performed by a set of asynchronous transceivers operating as a distributed joint communication system are disclosed hereinbelow.

Figure 1:
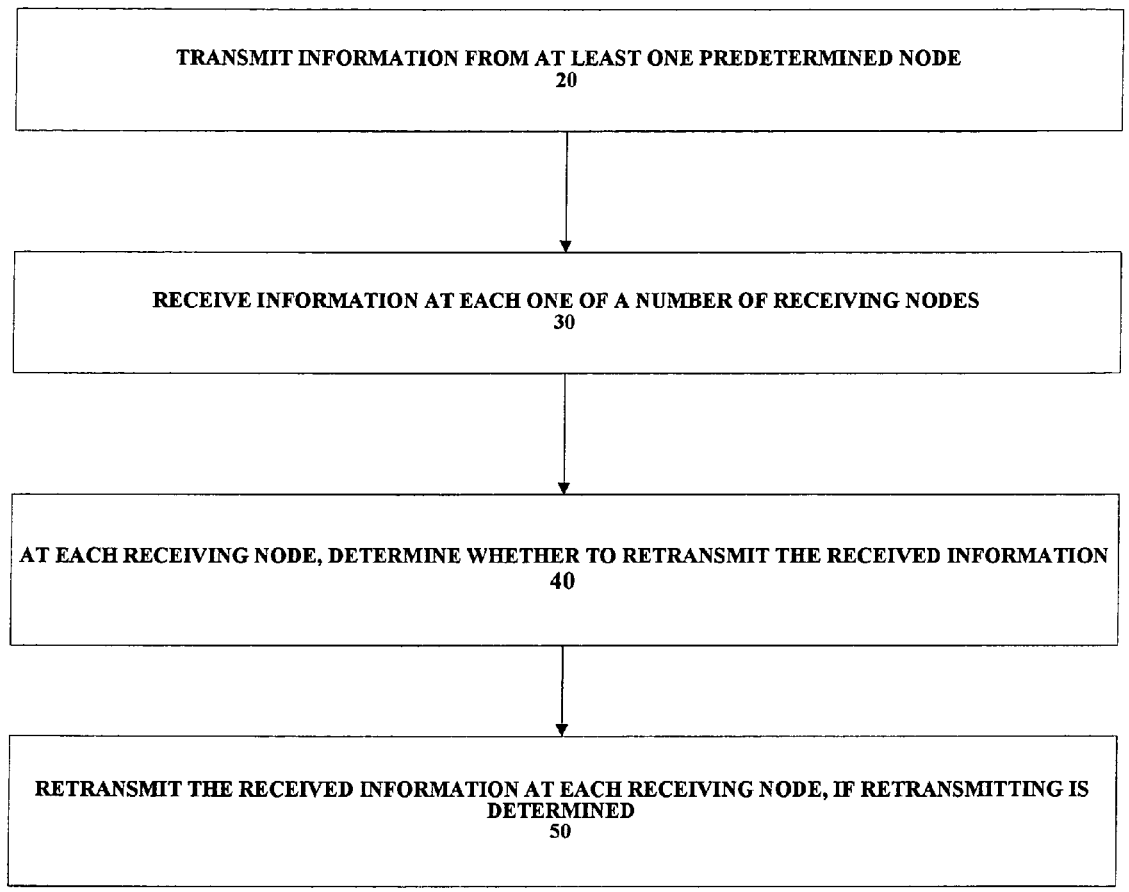
FIG. 1 is a flowchart representation of one embodiment of the method of this invention.

FIG. 1 is a flowchart representation of one embodiment of the method of this invention. Referring to FIG. 1, information is transmitted from one or more predetermined nodes (the source nodes) in the network (step 20, FIG. 1). The information is received at the other nodes (the receiving nodes) in the network (step 30, FIG. 1). Each of the receiving nodes receives an accumulation of signals from nodes transmitting an earlier stage. At each of the receiving nodes a predetermined criterion is utilized to decide whether to retransmit the received information (step 40, FIG. 1). If retransmission is indicated, the information is retransmitted from the receiving nodes (step 50, FIG. 1). The transmission method of this invention is hereinafter also called an Opportunistic Large Array (OLA) method.

In one embodiment of the method of this invention the step of determining whether to retransmit comprises the steps of determining a pair wise symbol error probability for received information at each one of the receiving nodes, and determining at each one of the receiving nodes whether the pair wise symbol probability satisfies a predetermined criterion.

In one embodiment, the receiving nodes (also called Opportunistic Large Array—OLA-nodes) have the choice of transmitting the received (also referred to as detected) symbol or to stay silent. In one embodiment, hereinafter referred to as the regenerative scheme, the predetermined retransmission criterion applied at each of the receiving nodes includes retransmitting only from nodes whose pair wise symbol error probability (in one embodiment, but not a limiting condition, not considering error propagation) is below a pre-selected upper-bound actively reply.

In another embodiment of the method of this invention the step of determining whether to retransmit comprises the steps of determining a signal to noise ratio for received information at each one of the receiving nodes, and determining at each one of the receiving nodes whether the signal to noise ratio satisfies a predetermined criterion. In the above described embodiment, hereinafter referred to as the non-regenerative scheme, only nodes whose SNR is above a fixed threshold actively reply.

Figure 2A:
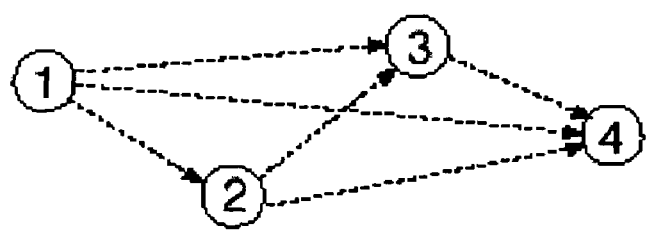
FIG. 2a is a graphical schematic representation of a four node embodiment of a system of this invention.
Figure 3:
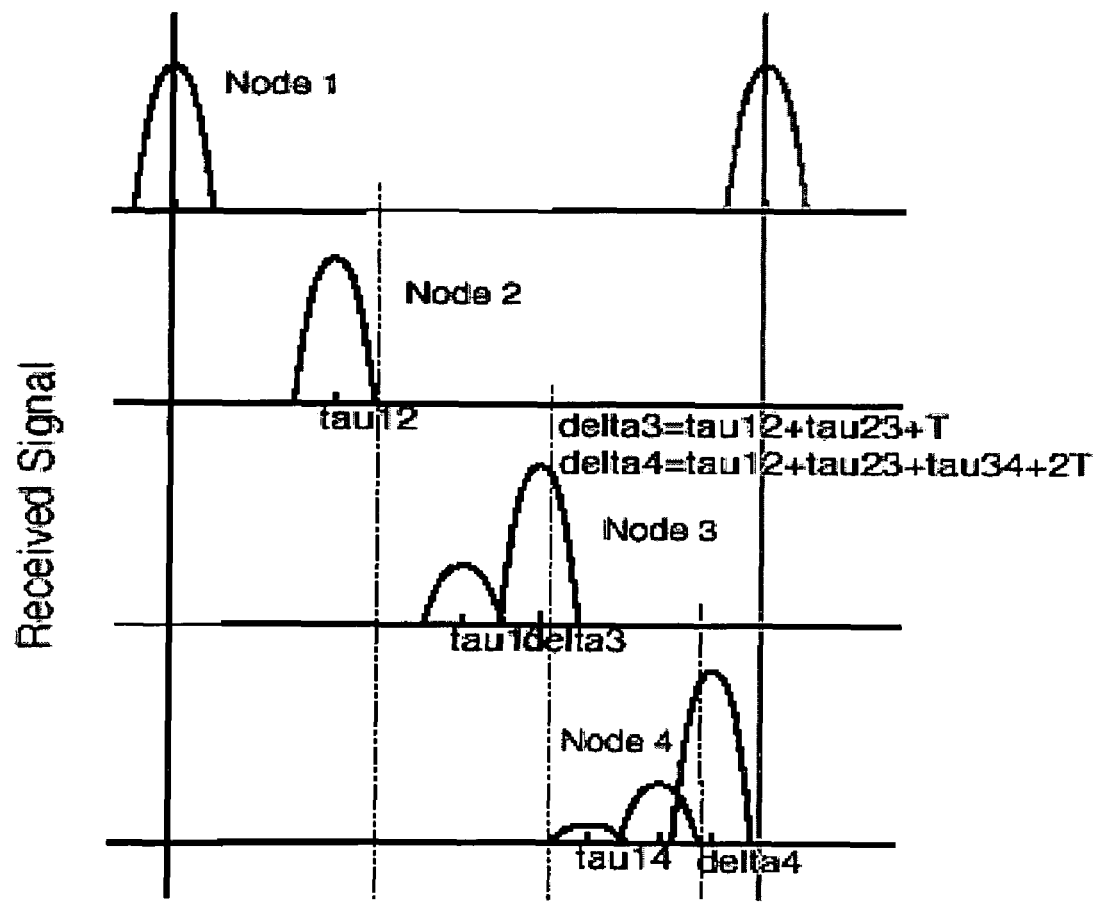
Figure 2B:
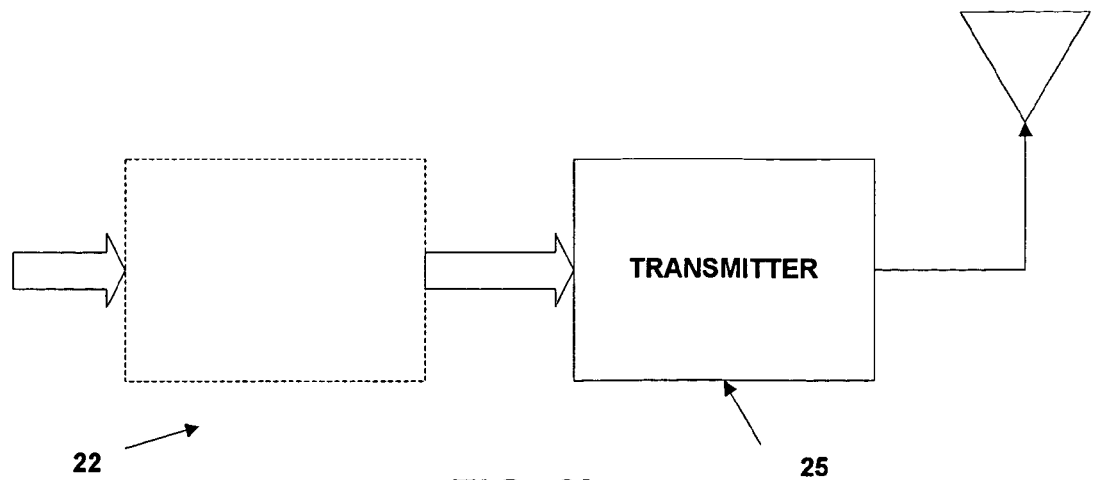
FIG. 2b is a schematic block diagram representation of an embodiment of a leader node of this invention.
Figure 2C:
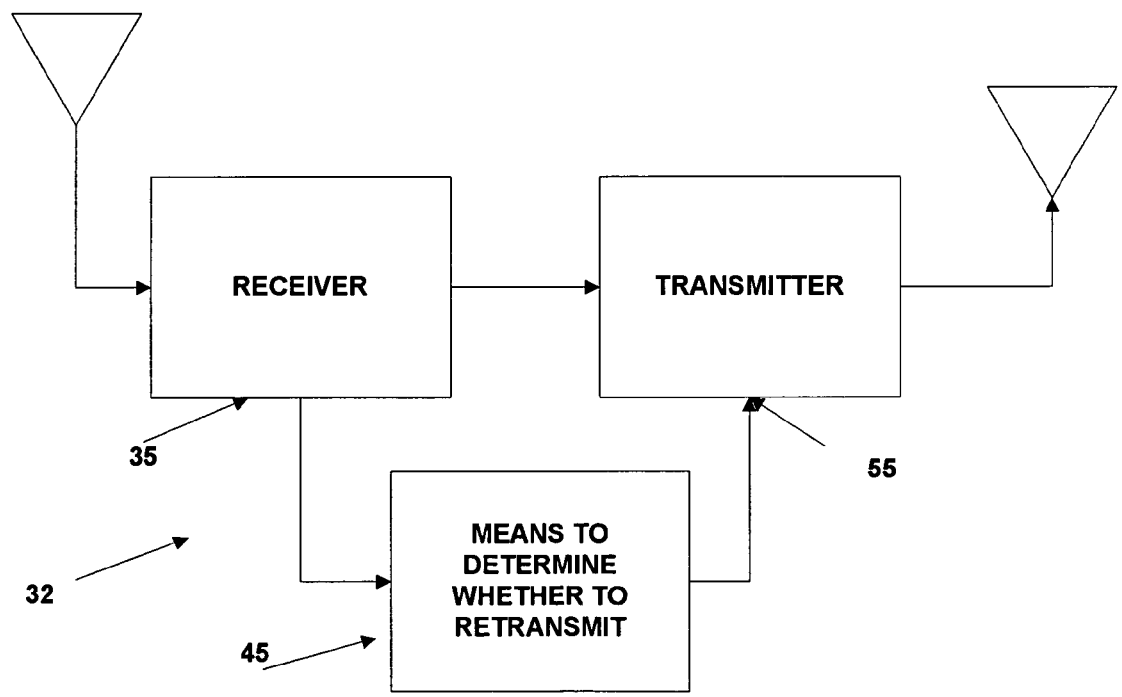
FIG. 2c is a schematic block diagram representation of an embodiment of a receiving node of this invention.

A graphical schematic representation of a four node embodiment 10 of a system of this invention is shown in FIG. 2a. Node 1 is selected as a leader (source, also referred to as transmitting) node, and nodes 2, 3, and 4 are the receiving nodes. FIG. 3 depicts a graphical schematic representation of the aggregated signals received at each receiving node, nodes 2, 3, and 4 of the system shown in FIG. 2a. Each node receives an accumulation of signals from nodes transmitting in the earlier stage, and retransmits when the predetermined retransmission criterion is achieved. The signal is received using an adaptive receiver. A generalized embodiment of the system of this invention includes a number of nodes. One of the nodes is the source (transmitting) node 22, shown schematically in FIG. 2b, and includes a transmitter 25 (a transmitter as used herein may include a transmitting component such as, but not limited to, an antenna). The remaining nodes are receiving nodes and each receiving node 32, one of which is shown schematically in FIG. 2c, includes a receiver 35 (a receiver as used herein may include a receiving component such as, but not limited to, an antenna), means for applying a predetermined retransmission criterion (such as computing means) 45, and a transmitter 55. In one embodiment the receiver, means 45 for applying a predetermined retransmission criterion, and the transmitter could be integrated in one system, hereinafter referred to as a transceiver.

In one embodiment, each node in the OLA network is assumed to have identical transmission resources, therefore, any node has the ability of assuming the role of a leader. The leader can be chosen by any predetermined criterion including, but not limited to, being the cluster-heads in clustering algorithms, or simply some node that has information to send.

Figure 2D:
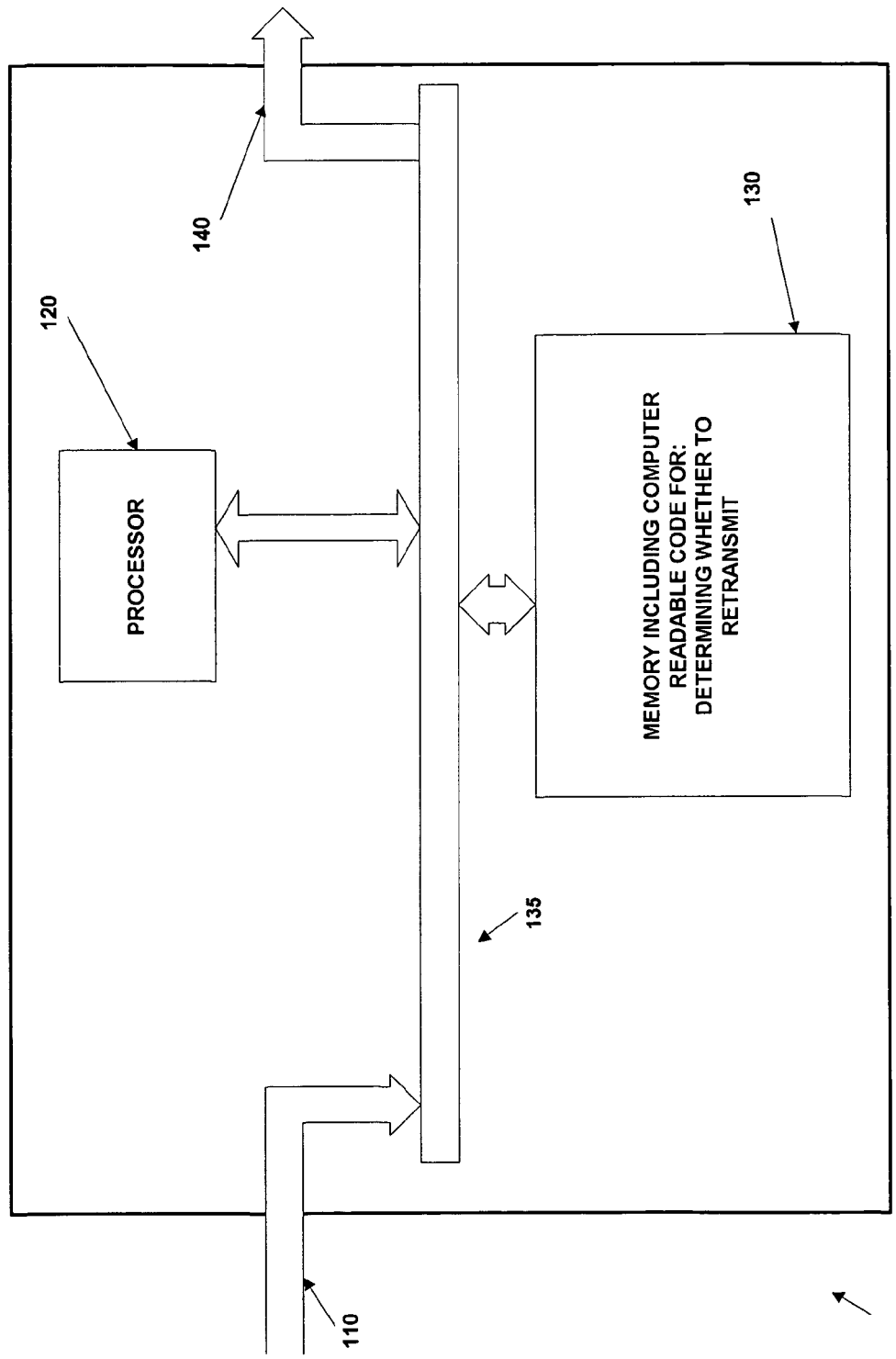
FIG. 2d is a schematic block diagram representation of an embodiment of a component of a receiving node of this invention.

One embodiment 100 of the means 45 for applying a predetermined retransmission criterion is shown in FIG. 2d. Referring to FIG. 2d, a received signal 110 is provided, in digital form, from the receiver 35 to a processor 120. The processor 120 can comprise one or many processing units. A computer usable medium 130 that has computer readable code embodied therein for applying a predetermined criterion to decide whether to retransmit the received information. The computer readable code causes the processor 120 to determine whether to retransmit the received information and to generate an enabling or disabling signal 140 which is provided to the transmitter 55. The processor 120 and the computer usable medium 130 are operatively connected through interconnection means 135 (such as, but not limited to, a bus). It should be noted that equivalently, the same functions shown in FIG. 2d could be accomplished by application specific or field programmable components.

Figure 2E:
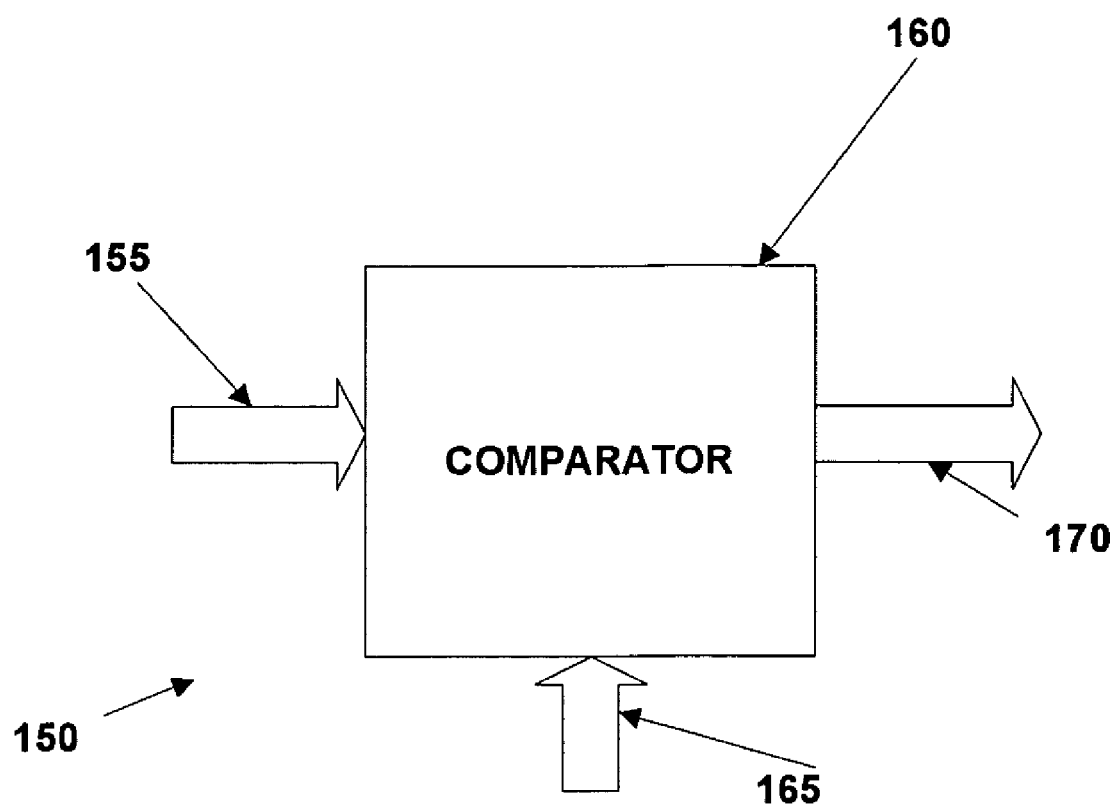
FIG. 2e is a schematic block diagram representation of another embodiment of a component of a receiving node of this invention.

Another embodiment 150 of the means 45 for applying a predetermined retransmission criterion is shown in FIG. 2e. Referring to FIG. 2e, a signal 155, indicative of a predetermined quantity and determined from the received signal 110, is provided from the receiver 35 to a comparator 160. A signal 165, indicative of a predetermined criterion is also provided to a comparator 160. The comparator 160 generates an enabling or disabling signal 170 which is provided to the transmitter 55.

In an embodiment of the network of N nodes of this invention transmitting over a shared medium, each node is part of a multiple stage relay of single source transmitting towards a remote receiver whose position is unknown to all the nodes. If no node in the network is powerful enough to communicate reliably with the remote receiver the problem is denoted as the reach-back problem. Coordination among nodes in a large network is an extremely difficult task, therefore, a cooperative transmission mechanism is designed for which cooperation is obtained in a distributed fashion.

In one embodiment of the systems and methods of this invention, the leader transmits a pulse with complex envelope $p_m(t)$ out of an M-ary set of waveforms. The resulting signal at the ith receiver is $$r_i(t) = g_{i,m}(t) + n_i(t), \quad (1)$$

$$s_{i,m}(t) = \sum_{n=1}^{N} A_{i,n}(t) p_m(t - \tau_{i,n}(t)), \, m = 0, \ldots, M-1 \quad (2)$$

where $n_i(t)$ is the ith receiver Additive White Gaussian Noise (AWGN) with variance $N_0$;

$\tau_{i,n}(t)$ is the delay of the link between the ith and the nth node, including the asynchronous of the beginning of transmission for each node n; and Ai,n(t) is the product of a complex fading coefficient $\omega_{i,n}(t)$ times the transmit power $P_t$ times the channel average gain, e.g. a $(1+d_{i,n})^{-\alpha_{i,n}}$ (lognormal fading) where $d_{i,n}$ is the distance and $\alpha_{i,n}$ the decay constant between the ith and nth node.

In one embodiment of the system of this invention $A_{i,n}(t)$ and $\tau_{i,n}(t)$ are constant over multiple symbol durations $T_s$, therefore, the time dependence for both of them is omitted in later derivations. Physically, the nodes are quasistationary for a time much greater than $T_s$; the delays are $\tau_{i,1} < \tau_{i,2} < \ldots \leq \tau_{i,N}$, where the minimum delay $\tau_{i,1}$ corresponds to the leader. To avoid Inter Symbol Interference (ISI) the upper-bound for the effective symbol rate is $R_s = 1/T_s \leq 1/\Delta t$, where $\Delta t$ is the maximum delay spread of $S_{i,m}(t)$ for all i.

The delay spread for node i is defined as $$\sigma_{\tau_i} = \sqrt{\int_{-\infty}^{\infty} (t - \bar{\tau}_i)^2 \cdot |s_{i,m}(t)|^2 \, dt} \quad (3)$$

where the average delay is $$\bar{\tau}_i = \int_{-\infty}^{\infty} t \cdot |s_{i,m}(t)|^2 \, dt$$

and, thus, $\Delta t = \max_i \sigma_{\tau_i}$.

Echoes that come from farther away are strongly attenuated (by $\approx d^{-\alpha}$), therefore, the echoes received at node i are non-negligible only for those coming from nodes within a certain distance $\Delta d$ which essentially depends on the transmit power and path loss. Hence, Rs can be increased by lowering the transmit power, capitalizing on spatial bandwidth reuse. In the reach back problem, however, the delay spread is $\Delta \tau \approx \sup_i [\tau_{i,N} - \tau_{i,1}]$ because the receiver is roughly at the same distance from all nodes.

Figure 4:
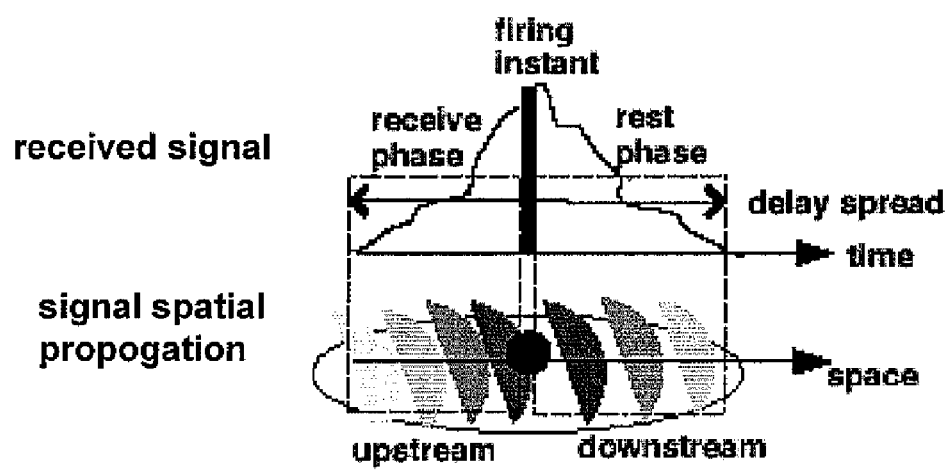
FIG. 4 is a graphical schematic representation of the signal received at a receiving node of the system of this invention.

In the above described embodiment of the system of this invention, Ts is fixed for all nodes to $c_1 \Delta \tau$ where $c_1$ is a constant taken to satisfy the ISI constraint. This embodiment guarantees that no ambiguity will occur at the nodes in timing their responses. The transmission activity of the node is solely dependent on the signal that the node receives. Based on the evolution of $s_{i,m}(t)$ two phases can be distinguished: 1) the earlier receive phase, when the upstream waves of signals approach the node and, 2) the period after the firing instant, which is hereinafter called the rest phase, where the node hears the echoes of the downstream wave of signals fading away (for the regenerative case, the firing instant occurs shortly after the time when the node has accumulated enough energy to detect the signal). The switching between the two modes can be viewed as a very elementary form of Time-Division Duplex (TDD) (see FIG. 4).

In the above described embodiment of the system of this invention, the leader (and also the nodes in the regenerative case) transmit pulses with complex envelope $p_m(t)$ having limited double-sided bandwidth W and approximately duration $T_p$. By sampling at the Nyquist rate, $Np = T_p W$ is the approximate length of the sequence $\{p_m(k/W)\}$ of samples.

Multi-path propagation can be simply included in the above embodiment by increasing the number of terms in the summation in Equation (2). If the propagation of errors and noise that occurs in the case of regenerative and non-regenerative repeaters respectively are neglected, as in Equation (2), the embodiment of the system of this invention is equivalent to a multi-path channel, created by a set of active scatterers.

In the regenerative case, the response of the embodiment of the system of this invention is:

$$g_i(\tau) = \sum_{n=1}^{N'} A_{i,n} \delta(\tau - \tau_{i,n}). \quad (4)$$

The non-regenerative case is more complex due to the feedback effect that implies that not one but several signal contributions are scattered by each source. The received signal is:

$$g_i(\tau) = \sum_{n'=1}^{N'} A_{i,n'} \delta(t - \tau_{i,n'}). \quad (5)$$

For every possible path in the network, there is a contribution to the summation in Equation (5) that has an amplitude equal to the product of all the path link gains and a delay equal to the sum of all the path delays. Theoretically, the number of reflections $N' \to \infty$ because the signals and their amplified versions keep cycling in the network and adding up. Practically, the amplifiers are physically limited to emit no more power than the saturation level of the amplifiers at the nodes and the delay spread of the response is limited. If properly controlled, the contributions will keep adding up and then opportunistically serve the purpose of enhancing the signal.

Hence, the key for the non-regenerative design is to control the noise that accompanies the useful signal (as further described hereinbelow).

In both regenerative and non-regenerative cases the received signal can be rewritten as (* denotes the convolution):

$$r_i(t) = g_i(t) * p_m(t) + n_i(t), \qquad (6)$$

where $g_i(t)$ is the network impulse response, analogous to that of a multi-path channel. Equation (6) is illustrative of this invention, which allows the nodes operate as regenerative and non-regenerative repeaters and avoid any complex coordination procedure to forward their signals at the network layer and share the bandwidth at the Medium Access Control (MAC) layer. Also, no channel state information is used. The information flow is carried forward by using receivers that are capable to track the unknown network response $g_i(t)$, or directly the signature waveforms $s_{i;m}(t) = g_i(t) * p_m(t)$. Equation (6) can be expressed in matrix form where the convolution is expressed as a Toeplitz convolution matrix, $$\{G_i\}_{k,n} = \{g_i\}_{k-n}, n = 0, \ldots, N_p - 1;$$

$$k = 0, \ldots, N_t + N_p - 2,$$

and, equation (6) is expressed as $$r_i = G_i p_m + n_i.$$

The above embodiment of the system of this invention behaves as a frequency-selective channel, unless the pulse $p_m(t)$ is narrow-band compared to $1/\Delta\tau$, as it is the case for OLA-FSK embodiment described hereinbelow. Even when the nodes fire their signals periodically the mobility of the nodes causes changes of the response $g_i(t)$ over time. If most of the network is stationary and N is large, the inertia of the system will be such that mobile nodes will cause small changes in $g_i(t)$.

Since the transmission channel is bandlimited with passband bandwidth W, the signature waveform $p_m(t)$ will have to be bandlimited and, therefore, uniquely expressible through its samples taken at the Nyquist rate $1/T_c$, where $T_c = 1/W$. In general, $p_m(t)$ corresponds to a finite number of samples $N_p$ and is approximately time limited with duration $T_p \approx N_p/W$.

For example, in linear modulations (e.g. PAM, QAM and PSK) $N_p = 1$ while $N_p$ is equal to the alphabet size in the case of orthogonal modulations (e.g. FSK). In one embodiment, the system (OLA) response in discrete time can be obtained by sampling at the Nyquist rate the complex envelope of the received signal $r_i(t)$, as shown in U.S. Provisional Patent Application Ser. No. 60/504,845, incorporated by reference herein, and in Anna Scaglione and Yao-Win Hong, *Opportunistic large arrays: cooperative transmission in wireless multihop ad hoc networks to reach far distances*, IEEE Transactions on Signal Processing, Vol. 51, No. 8, August 2003, pp. 2082-2092, also incorporated by reference herein.

It should be noted that although the effect of error and noise propagation at the successive levels of OLA relays has been neglected in the above described embodiment, that is not a limitation of this invention. If a node receives a very weak signal compared to the noise level so that it cannot take reliable decisions or it would mostly increase the noise level for the other receivers, in many embodiments, it remains silent. Further discussions on these issues and the repetition strategy for the regenerative and non-regenerative schemes are described herein below.

The transmission of the OLA is led by one or more predetermined source nodes in the network. All the other nodes form multiple stages of relays to either flood the network with the information from the source, or just to pass the information to a remote receiver. The intermediate nodes in OLA have a choice of whether to relay or not, depending on the performance at that node. In order to enhance the understanding of the present invention, an analysis of the effects of regenerative and nonregenerative OLA is presented herein below.

In the embodiment of the system of this invention utilizing the regenerative scheme, the OLA nodes has the choice of retransmitting its detected symbol or to stay silent. Only nodes whose pair wise symbol error probability of the ith receiver (not considering error propagation), based on the estimates of all possible signatures $G_i p_m$ and receiver noise variance, is below a fixed upper-bound $\epsilon$, i.e.:

$$\max_m Pr\{m \to \mu\} \leq \epsilon, \forall \ \mu \neq m, m = 0, \ldots, M - 1.$$

reply.

In the embodiment of FIG. 2d, computer readable code for determining the pair wise symbol error probability of the ith receiver and for comparing the determined pair wise symbol error probability to a predetermined threshold, $\epsilon$, comprise the means for determining whether to retransmit. In another embodiment of the means for determining whether to retransmit, shown in FIG. 2e, a signal 155, indicative of the pair wise symbol error probability and determined from the received signal 110, is provided from the receiver 35 to a comparator 160. (Such a signal 110 may be, in one embodiment but not a limitation of this invention, a signal indicative of received energy.) A signal 165, indicative of a predetermined criterion, $\epsilon$, is also provided to the comparator 160. The comparator 160 generates an enabling or disabling signal 170 which is provided to the transmitter 55.

In the $N_s$ samples contained in each symbol period the time instant selected for the detection and subsequent echo is the first sample $N_i \leq N_s$ at which the node replies. If there is no such sample the node will never echo the signal (but it may obviously detect the information). The process is illustrated in the following example.

Figure 5:
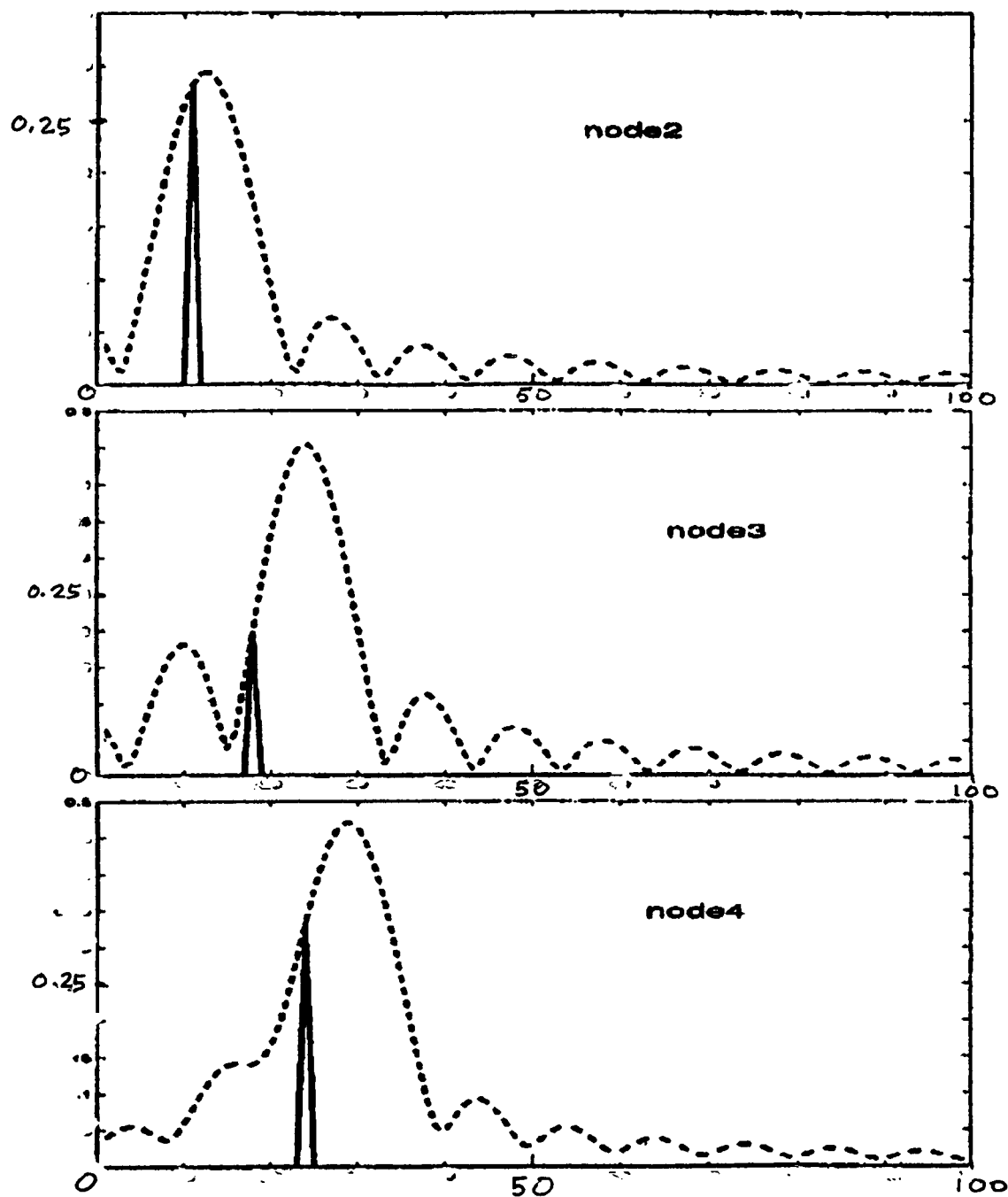

Consider a regenerative OLA scenario with 4 nodes as shown in FIG. 2a. Let node 1 be the leader node, and nodes 2, 3, and 4 as regenerative relays. In FIG. 5, the aggregated signals received at nodes 2, 3, and 4 are sketched. The spikes represent the point where each node achieves its SNR threshold and starts its transmission, this is referred to as the firing instant. Node 2 only receives the signal transmitted by node 1 before it achieves the threshold and starts rebroadcasting. Node 3, however, receives the accumulation of energy from both nodes 1 and 2, thus, achieves the SNR threshold by just receiving a small portion of the signal from node 2. Similarly, node 4 receives signals from nodes 1, 2, and 3. After the SNR threshold is met (i.e. after the spikes), each node switches to transmitting mode for one symbol period, and does not start receiving until a symbol period $T_s$ has expired. Therefore, the signal coming from later nodes will not be received by the earlier nodes.

In order to better describe the method of this invention, the following illustrative example is presented. In one embodiment, each node operates in two modes: (1) the receive phase, in which the node waits until it presumes to provide "reliable" detection of the signal at which point it 'fires'; and (2) the rest phase, the node silently waits till the end of $T_s$ without any further transmissions. Thus, with each symbol, each node has the option of retransmitting or opting to stay silent if it believes that the detection will be unreliable. This decision is made at the node based on whether or not it satisfies the predetermined criterion. Thus, the firing time at the node is chosen such that the predetermined criterion is satisfied.

For BPSK modulation and a minimum distance detector, the probability of error is solely determined by the Signal to Noise ratio (SNR):

$$P_{BPSK}(E) = P(m \to \mu) = Q\left(\frac{d}{2\sigma}\right) = Q\left(\sqrt{\frac{2E_b}{N_0}}\right)$$

Since noise is an inherent parameter, noise power $N_0$ given a specific value. The only variable left is the signal energy, $E_b$. Therefore, in the receive phase, the receiver determines if the upper bound, $\epsilon$, is satisfied by continuously polling to get an updated reading of the received signal's energy. The firing time is then the instant the signal energy exceeds a threshold.

The effect of the error propagation can be included by selecting an appropriate (smaller) $\epsilon$. Of course, decreasing $\epsilon$ will cause fewer nodes to reply and fewer nodes will contribute to the signal power. Details of the analysis of the effects of error propagation are given in U.S. Provisional patent Application Ser. No. 60/504,845 and in Anna Scaglione and Yao-Win Hong, *Opportunistic large arrays: cooperative transmission in wireless multihop ad hoc networks to reach far distances*, IEEE Transactions on Signal Processing, Vol. 51, No. 8, August 2003, pp. 2082-2092.

In the non-regenerative embodiment, every node that achieves the SNR constraint amplifies the signal coming from the other nodes as well as their receiver noise. Hence, the noise $n_i$ in Equation (6) has a rather complex structure, since it includes the noise that comes from every node that has transmitted previously and all its subsequent amplifications along with the signal. Since the geographical area is limited, the delay spread of each node response will also be limited, as far as the signal to noise contribution is concerned. Considerations on the SNR can be deduced by considering the inherently recursive structure of the signal composition. From Equation (6), the signal received by node i at time k is:

$$r_i(k) = \sum_{l=0}^{N_p-1} p_m(l) g_i(k-l) + n_i(k),$$

where $n_i(k)$ includes the noise at the ith receiver plus all the noise contributions that were added at each receiver and propagated through the network up until the kth sample.

In one embodiment utilizing non-regenerative repeaters, only nodes in which the signal to noise ratio at the node, $SNR_i$, is above a fixed threshold, $\bar{\xi}$, that is, $SNR_i > \bar{\xi}$ are active in the OLA network. In one embodiment, $$\frac{E\{\|G_i p_m\|^2\}}{E\{\|n_i\|^2\}} \geq \beta,$$

where $\beta \geq 0$, $g_i$ includes all the echoes and $n_i$ the noise of the nodes that amplified the signal.

In one embodiment, the signal energy is (the expectation is over the symbols):

$$\simeq \sum_i E\{\|G_i p_m\|^2\} |A_{p,i}|^2$$

and the average noise energy is:

$$\simeq \sum_i E\{\|n_i\|^2\} |A_{p,i}|^2 + E\{\|z_p\|^2\}$$

From the above, in one embodiment, the signal to noise ratio (SNR) at the pth node can be expressed as $$\frac{E_p}{\eta_p} \simeq \frac{\sum_i E\{\|G_i p_m\|^2\}|A_{p,i}|^2}{\sum_i E\{\|n_i\|^2\}|A_{p,i}|^2 + E\{\|z_p\|^2\}}$$

$$= \frac{\sum_i E\{\|G_i p_m\|^2\}|A_{p,i}|^2}{\sum_i \frac{E\{\|n_i\|^2\}|A_{p,i}|^2 E\{\|G_i p_m\|^2\}}{E\{\|G_i p_m\|^2\}} + E\{\|z_p\|^2\}} >$$

$$(\beta^{-1} + \xi_p^{-1})^{-1}, \text{ where}$$

$$\xi_p \triangleq \frac{E\{\|G_p p_m\|^2\}}{E\{\|z_p\|^2\}} \approx \frac{\sum_i E\{\|G_i p_m\|^2\}|A_{p,i}|^2}{E\{\|z_p\|^2\}},$$

Since $\beta \geq 0$, taking into account the behavior of the OLA network as the OLA "wave" advances, and setting the threshold, $\bar{\xi}$, high enough to compensate for the loss due to the relaying process, in one embodiment, the SNR condition can be approximated by $\xi_i > \bar{\xi}$ where $$\xi_i = \frac{E\{\|G_i p_m\|^2\}}{E\{\|z_i\|^2\}}.$$

In the embodiment, for non-regenerative repeaters, of FIG. 2d, computer readable code for determining the signal to noise ratio (SNR) (or an approximate value) of the ith receiver and for comparing the determined SNR to a predetermined threshold, $\bar{\xi}$, comprise the means for determining whether to retransmit. In another embodiment of the means for determining whether to retransmit, shown in FIG. 2e, a signal 155, indicative of the signal to noise ratio (SNR) (or an approximate value) and determined from the received signal 110, is provided from the receiver 35 to a comparator 160. A signal 165, indicative of a predetermined criterion, $\bar{\xi}$, is also provided to the comparator 160. The comparator 160 generates an enabling or disabling signal 170 which is provided to the transmitter 50.

Further details of the signal to noise ratio for the embodiment utilizing non-regenerative repeaters are given in U.S. Provisional patent Application Ser. No. 60/504,845 and in Anna Scaglione and Yao-Win Hong, *Opportunistic large arrays: cooperative transmission in wireless multihop ad hoc networks to reach far distances*, IEEE Transactions on Signal Processing, Vol. 51, No. 8, August 2003, pp. 2082-2092.

In one embodiment, the transmitted signal is linearly modulated. In another embodiment, the modulation of the transmitted signal produces orthogonal signals. In a further embodiment, a modulation method of this invention, Leader Position Modulation, is used. Denote by $s_{i,m} = G_i p_m$ The modulation signature of the mth symbol viewed by the ith node is denoted by $$s_{i,m} = G_i p_m$$

The receiver index i is omitted when it is not necessary for the sake of the derivations.

Because the receiver does not have exact knowledge of the signal space, the optimum Maximum Likelihood (ML) receiver structure differs from the classic ML receiver in AWGN where it is simply a minimum distance detector. However, when the mean square error (MSE) of the estimates of $\hat{s}_{i,m}$ is much smaller than the noise variance $N_0$, the structural and performance differences between the true ML receiver and the Additive White Gaussian Noise (AWGN) ML receiver will be negligible.

In the embodiment in which the transmitted signal is linearly modulated, the leader signal is simply $x_m p(t)$ where $x_m$ is the complex symbol that belongs to an M-ary constellation (QAM, ASK, PSK) and p(t) is a Nyquist pulse with bandwidth W. Thus, with $p_m=x_m$ from Equation (9), the received signal at the ith Node is $$r_i = g_i x_m + n_i.$$

The signal space for the complex envelope is one dimensional (two dimensions in R). Omitting the receiver index i, the ML detection rule is:

$$\hat{x}_m = \underset{p}{\operatorname{argmax}}\, p(r \mid x_p),$$

where $p(r|x_p)$ is the joint probability density function of r given $x_m$. The joint probability density functions, $p(r|x_p)$, are determined by the error/noise propagation mechanism and by the fact that the receiver has imperfect knowledge of $$g = \hat{g} + e.$$

The OLA system is a Spread Spectrum System where the bandwidth of the symbol is much larger than the effective symbol rate. The Spreading Factor of the system is $N_s = T_s W$. Therefore, the projection $$r^* \hat{g}$$

is also effectively equivalent to the despreading of a Direct Sequence Spread Spectrum (DS-SS) signal.

Further details of the detection of the linearly modulated OLA signal are given in U.S. Provisional patent Application Ser. No. 60/504,845 and in Anna Scaglione and Yao-Win Hong, *Opportunistic large arrays: cooperative transmission in wireless multihop ad hoc networks to reach far distances*, IEEE Transactions on Signal Processing, Vol. 51, No. 8, August 2003, pp. 2082-2092.

Orthogonal signaling has the appealing property of being power efficient and allowing simple incoherent envelope detection. On-Off Keying (OOK) as well as both Frequency Shift Keying (FSK) and Pulse Position Modulation (PPM) can be implemented in embodiments of the OLA system, as shown in U.S. Provisional patent Application Ser. No. 60/504,845, and in Anna Scaglione and Yao-Win Hong, *Opportunistic large arrays: cooperative transmission in wireless multihop ad hoc networks to reach far distances*, IEEE Transactions on Signal Processing, Vol. 51, No. 8, August 2003, pp. 2082-2092. In embodiments of this invention that adopt incoherent schemes such as OOK or FSK, the receivers are simply energy detectors and only symbol synchronization is required, but not training.

The OLA-PPM embodiment is compatible with an Ultra-Wideband Radio Interface and in this case the OLA system produces a Time-Hopping (TH) code (a sort of bar code that is distinctive of the specific leader triggering the OLA). Further details of the detection of the orthogonally modulated OLA signal are given in U.S. Provisional patent Application Ser. No. 60/504,845, and in Anna Scaglione and Yao-Win Hong, *Opportunistic large arrays: cooperative transmission in wireless multihop ad hoc networks to reach far distances*, IEEE Transactions on Signal Processing, Vol. 51, No. 8, August 2003, pp. 2082-2092.

Multiple clusters of ad hoc wireless nodes can form a multi-OLA system, constructing a multiple access system with the cluster of nodes acting as a team through cooperative transmission rather than transmitting independent data from each node.

An embodiment of the OLA system creates a pseudo-noise spreading signature $g_i$ which appears to be different depending on the relative positioning of the nodes in the network. If there are M leaders, each leader will generate a different signature at node i, which is hereinafter denoted by $$g_i^{[m]}$$

m=0, ..., M−1, and, if the positions of the leaders are sufficiently separated and N>>1, the signatures will be likely to have low cross-correlation, exactly as in a multiple access DS-SS system. Even if the transmissions from the leaders are not synchronized, the low cross-correlation among signatures will allow to mitigate the multi-user interference (MUI).

An embodiment, which is implemented by a multiple access OLA system, of the method of this invention includes transmitting information from each one of a number of predetermined leader nodes, receiving at each one of the receiving nodes information transmitted from at least one of the number of predetermined leader nodes and information transmitted from other nodes from the receiving nodes, determining at each one of the receiving nodes whether to retransmit the received information, and, retransmitting the received information from each one of the receiving nodes, if retransmitting is determined. In one embodiment, each predetermined leader node is capable of generating a different signature at a location of each of at least some of the receiving nodes. The method can include the regenerative mode and the non regenerative mode disclosed above.

Note that there is no difference in terms of timing requirements between the systems of this invention and a classic DSSS physical layer in an asynchronous network. In addition, the probability that a node will to have to react to two different leaders at the same time instant is low. In any case the problem can be easily overcome by letting the nodes give priority to one of the leaders chosen arbitrarily, discriminating them through their signatures.

By exploiting the same mechanism, a method of modulation of this invention can be applied if M leaders have access to the same information that has to be forwarded to the remote destinations. In fact, the mth symbol information can be embedded in the signal sm(t) by letting the mth leader transmit a pulse p(t):

$$s_m(t) = \sum_{n=1}^{N} A_n^{(m)} p(t - \tau_n^{(m)}).$$

This modulation method of this invention is hereinafter referred to as Leader Position Modulation (LPM). In one embodiment, the receiver is trained to receive all the signatures $s_m(t)$ and the asynchronism between the leaders epochs can be taken into account by appropriately extending the duration of the symbol $T_s$ to avoid inter symbol interference (ISI). In any case, the signatures have low cross-correlation and the effect of moderate ISI is going to be mitigated by the spreading-gain.

The advantages of LPM are: 1) The leaders and followers just transmit one type of pulse, which simplifies the transmitter scheme; 2) The followers do not have to detect the information from the leader, unless they want to. The followers simply have to transmit the pulse p(t) in response to a power variation in the signal they sense at specific time instants, each associated to a particular leader. This considerably simplifies the operations that the individual nodes have to perform to contribute to the OLA.

Embodiments of adaptive receivers for use with the systems of this invention are described below. If the mobility of the transmitters is limited, or at least the large part of the nodes do not change their position and behavior, the signature will have modest variations that the receiver can track adaptively. The signal estimation could be formulated as either a pure waveform estimation problem, or a channel estimation problem of a frequency selective channel. Two embodiments are presented hereinbelow: estimation based on training and blind estimation.

Embodiments utilizing Signal Estimation with Training are described hereinbelow. If low probability of detection (LPD) is desired, the leader transmitter can modulate the successive replicas of $s_m$ with a pseudo-noise sequence c(i) such that |c(i)|=1. Thus, with L training symbols, the symbol estimate can be obtained:

$$r_i(n) = c(n)s_{i,m} + n_i(n) \Rightarrow \hat{s}_{m,p} = \frac{1}{L}\sum_{n=1}^{L} c*(n)r_p(n)$$

The Mean Square Estimation Error (MSE) for each of the signature waveforms is $$MSE = E\{\|\hat{s}_{i,m} - s_{i,m}\|^2\} = \frac{E\{\|n_i\|^2\}}{L}.$$

The receiver can adaptively update the estimations in a decision-directed mode where the successive symbols will have the same effect as the training data if the decisions are mostly correct. The accuracy will increase as long as the network configuration does not change. More importantly this method allows to track the changes in the network, which necessarily will occur due to the fact that the network is wireless and the nodes are mobile.

Blind estimation methods are always important in a decentralized scenario such as wireless ad hoc networks. Without such techniques, when an additional or returning node joins the network it is necessary for the whole system to stop and restart the training phase.

To estimate $g_i$ the receiver can utilize second order subspace identification methods commonly used in array processing. The OLA signature can be estimated as the maximum eigenvector of the correlation matrix of the received vector, which can be estimated using the sample correlation. The channel estimate can be done by repeatedly updating this covariance matrix and using subspace tracking techniques.

As previously described, the OLA signaling is a spread spectrum technique, therefore, it is possible to have multiple OLA networks transmitting simultaneously to the same remote receiver. In the embodiment with multiple OLA networks transmitting simultaneously to the same remote receiver, subspace methods can identify the subspace spanned by the OLA signatures and higher order methods (for example, a Constant Modulus Algorithm) can be utilized to separate the sources up to a permutation.

An embodiment of the system of this invention that can be applied to the reach back problem includes transmitting information from at least one predetermined leader node, receiving at each one of a number of receiving nodes the information transmitted from the one or more predetermined leader nodes and information transmitted from other receiving nodes, determining at each one of the receiving nodes whether to retransmit the received information, retransmitting the received information from each receiving node, if retransmitting is determined, and receiving at a remote node the information transmitted from the one or more predetermined leader nodes and the information retransmitted from the receiving nodes.

An embodiment of the system of this invention that can be applied to the reach back problem is described below. Considering the OLA structure 200 shown in FIG. 6, the reach back receiver 210 is simply another node, at i→∞ and the received signal can be expressed as:

$$r_\infty = G_\infty p_m + n_\infty.$$

Figure 6:
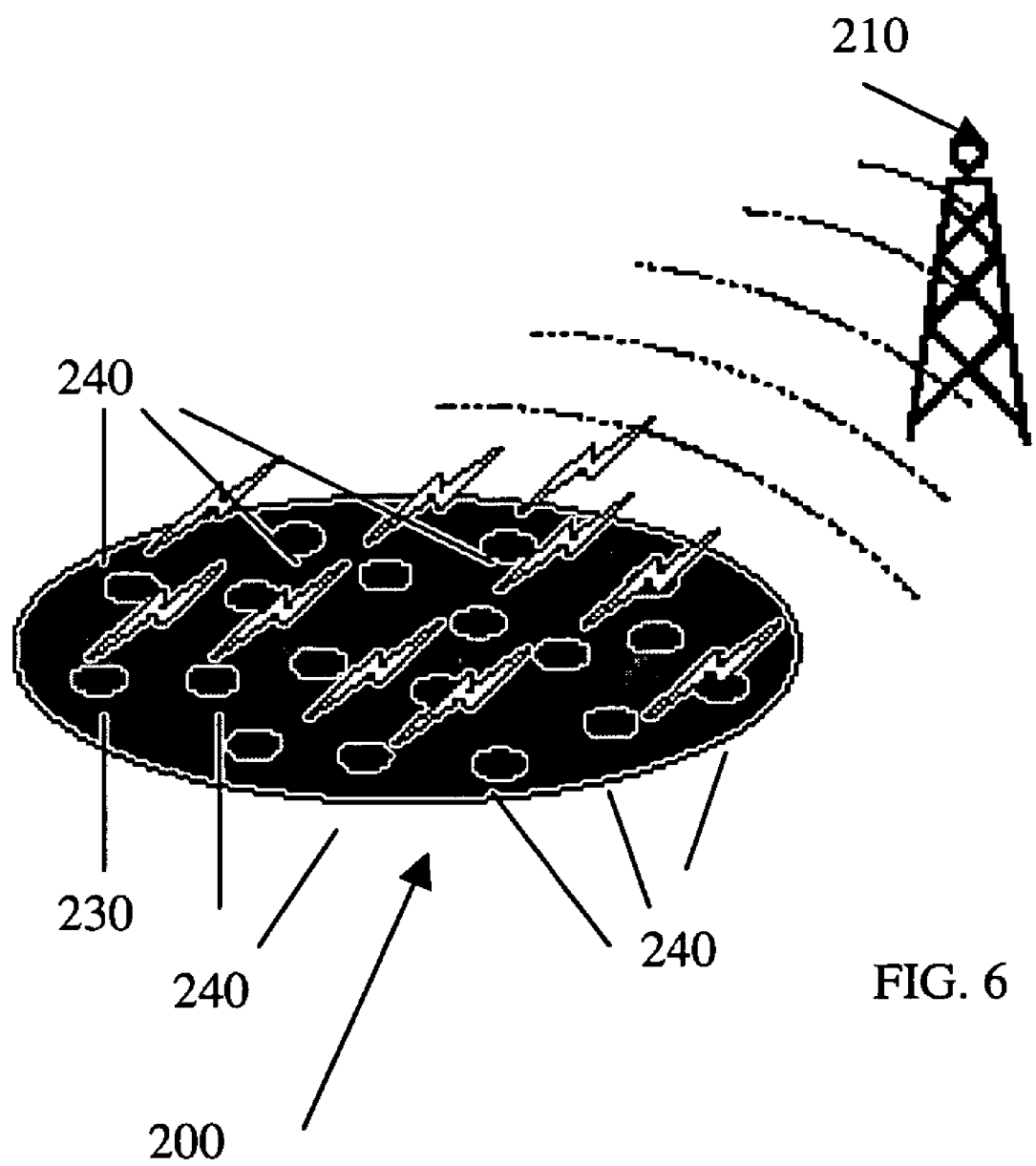
FIG. 6 is a graphical schematic representation of an embodiment of a system of this invention including a remote receiver; and, FIG. 7 is a graphical representation of results for a network of this invention.

The reach back node 210 is special in the sense that it does not participate in the relaying procedure of the embodiment of the OLA system 220. Referring to FIG. 6, the OLA system 120 includes at least one transmitting (leader) node 230 having a transmitter, a number of receiving nodes 240, and a remote (reachback) node 210 having a remote receiver (the remote receiver can be similar to the receiver at one of the receiving nodes but adapted to receive the remote node signature). Each one of the receiving nodes has a receiver, means for determining whether to retransmit received information, and a transmitter, such as that shown in FIG. 2c. Each receiving node is capable of retransmitting information received from at least one transmitting node and information received from other receiving nodes.

The reachback node can communicate to the network in a time or frequency division duplex mode, as in the familiar down-link broadcast channel scenario of standard cellular networks. If the error and noise propagation are not considered, $$E\{\|g_\infty\|^2\} = O(N).$$

Even if error and noise propagation are not strictly controlled and that, as a result, $SNR_{det}$ saturates to a specific value as N→∞, a gain is achieved over a non-cooperative schemes. In fact, in a system that relies only on point-to-point connections to deliver information, the signals at a far distance are weak compared to the receiver noise, even if they are clean from any additional noise term.

In order to better illustrate the method of this invention, a network of 100 nodes inside a square area of 350×350 m² is simulated. The reach back node 210 is 1 km away from the center of the network 220.

The BER performance at the remote receiver using a point-to-point link with the nearest node in the network is compared to that obtained using OLA. Each BER value in the simulation is averaged over 10 different network configurations with nodes randomly distributed in the specified area with a uniform distribution.

In the simulation each node-to-node transmission is assumed to experience independent small-scale fading with Rayleigh coefficients of variance 1. The large-scale fading is deterministic and the path loss model is based on the model used in ns2 [Network Simulator—ns2 Available at http://www.i0si.edu/nsnam/ns/] where the Free Space Model is used for distance d<$d_c$ (the cross-over distance) and the Two-ray Ground Reflection Model is used for d>$d_c$ where $d_c=4\pi/\lambda$.

Figure 7:
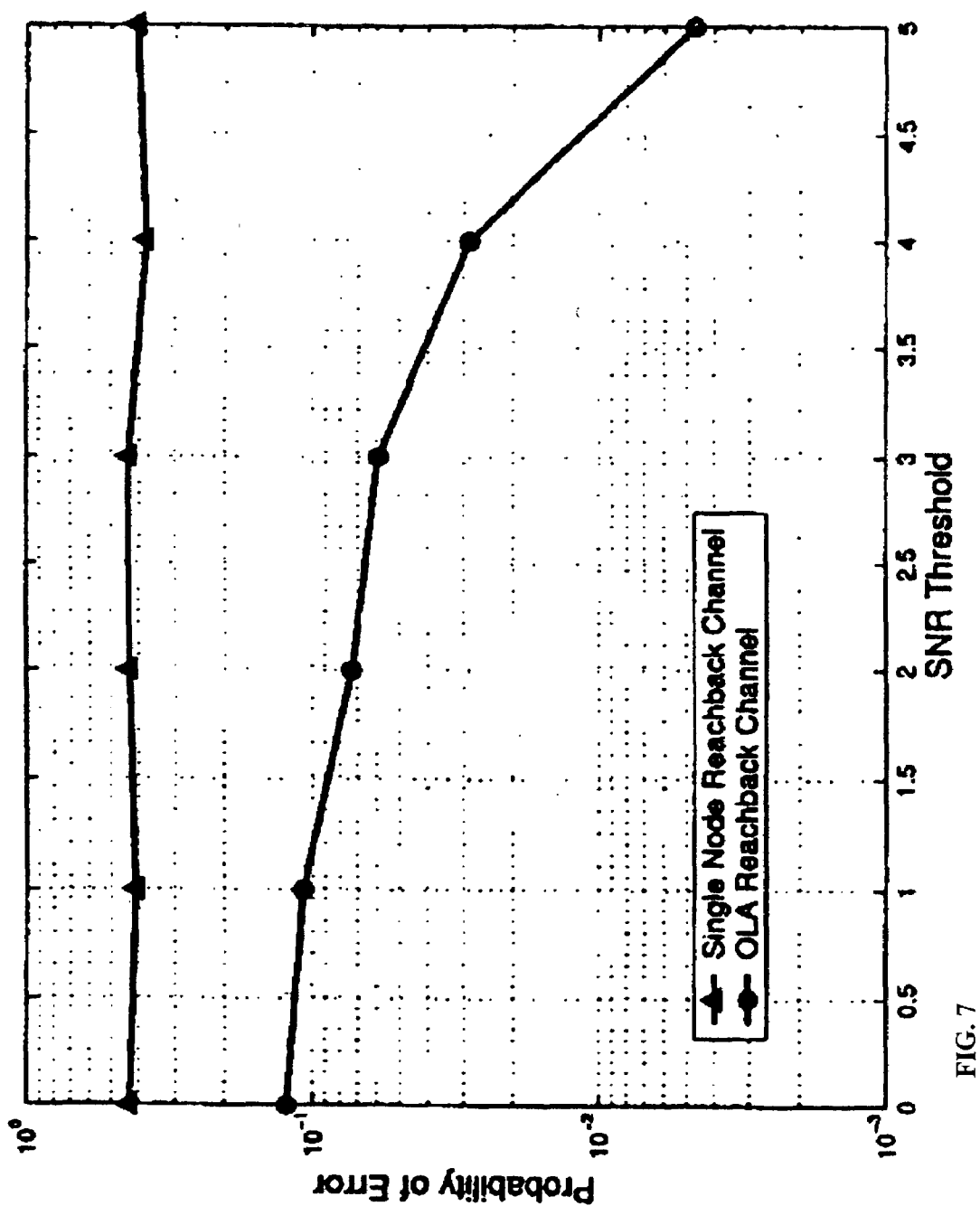

FIG. 7 shows that reach back communication is impossible without user cooperation, and that the performance improves due to the lower noise level and the reduced error propagation as the SNR threshold increases.

It should be noted that the invention is capable of embodiments in which any node has the ability of assuming the role of a leader.

In general, the techniques described above may be implemented, for example, in hardware, software, firmware, or any combination thereof. The techniques described above may be implemented in one or more computer programs executing on a programmable computer including a processor, a storage medium readable by the processor (including, for example, volatile and non-volatile memory and/or storage elements), at least one input device, and at least one output device. Program code may be applied to data entered using the input device to perform the functions described and to generate output information. The output information may be applied to one or more output devices.

Elements and components described herein may be further divided into additional components or joined together to form fewer components for performing the same functions.

Each computer program within the scope of the claims below may be implemented in any programming language, such as assembly language, machine language, a high-level procedural programming language, or an object-oriented programming language. The programming language may be a compiled or interpreted programming language.

Each computer program may be implemented in a computer program product tangibly embodied in a computer-readable storage device for execution by a computer processor. Method steps of the invention may be performed by a computer processor executing a program tangibly embodied on a computer-readable medium to perform functions of the invention by operating on input and generating output.

Common forms of computer-readable or usable media include, for example, a floppy disk, a flexible disk, hard disk, magnetic tape, or any other magnetic medium, a CDROM, any other optical medium, punched cards, paper tape, any other physical medium with patterns of holes, a RAM, a PROM, and EPROM, a FLASH-EPROM, any other memory chip or cartridge, a carrier wave, or any other medium from which a computer can read.

It should also be noted that although the embodiments disclosed above can be implemented as wireless systems, this invention is not limited to those systems but it applies to any broadcast medium.

Although the invention has been described with respect to various embodiments, it should be realized this invention is also capable of a wide variety of further and other embodiments within the spirit and scope of the appended claims.

What is claimed is:

1. A method for transmitting information in a network, the method comprising the steps of:
    a) transmitting information from at least one predetermined node;
    b) receiving, at each one of a plurality of receiving nodes the information transmitted from the at least one predetermined node;
    c) determining at each one of the plurality of receiving nodes whether to retransmit the received information;
    d) retransmitting, from each one of the plurality of receiving nodes, the received information if retransmitting is determined;
    e) receiving, at each one of another plurality of nodes in the network, a signal comprising a weighted summation of information transmitted from said each node from the plurality of receiving nodes at which retransmitting was determined;
    f) determining, at said each one of said another plurality of nodes, whether to retransmit the received signal; and
    g) retransmitting, from said each one of said another plurality of nodes, the received signal if retransmitting is determined.

2. The method of claim 1 where in the step of determining whether to retransmit comprises the steps of:
    determining a pair wise symbol error probability for received information at each one of the plurality of receiving nodes; and
    determining at each one of plurality of receiving nodes whether the pair wise symbol probability satisfies a predetermined criterion.

3. The method of claim 1 where in the step of determining whether to retransmit comprises the steps of:
    determining a signal to noise ratio for received information at each one of the plurality of receiving nodes; and
    determining at each one of plurality of receiving nodes whether the signal to noise ratio satisfies a predetermined criterion.

4. A network for transmitting information, the network comprising:
    at least one transmitting node comprising a transmitter; and
    a plurality of receiving nodes, each one node from said plurality of receiving nodes comprising:
        a receiver;
        means for determining whether to retransmit received information; and
        another transmitter;
    each node from said plurality of receiving nodes being capable of retransmitting information received from said at least one transmitting node and also capable of retransmitting a signal comprising a weighted summation of signals received from other nodes from said plurality of receiving nodes;
    whereby routing and multiple access overheads are not required.

5. The network of claim 4 wherein said receiver is an adaptive receiver;
    said adaptive receiver estimating network signatures.

6. The network of claim 5 wherein said adaptive receiver utilizes training for signal estimation.

7. The network of claim 5 wherein said adaptive receiver utilizes blind estimation for signal estimation.

8. The network of claim 5 wherein said determining means comprise:
    means for determining a pair wise symbol error probability for received signals at each one of the plurality of receiving nodes; and
    means for determining at each one of plurality of receiving nodes whether the pair wise symbol probability satisfies a predetermined criterion.

9. The network of claim 5 wherein said determining means comprise:
    means for determining a signal to noise ratio for received signals at each one of the plurality of receiving nodes; and means for determining at each one of plurality of receiving nodes whether the signal to noise ratio satisfies a predetermined criterion.

10. A method of modulating a signal, the method comprising the steps of:
transmitting substantially same information from a plurality of transmitting nodes;
embedding an information symbol in a network signature corresponding to transmission from one node from the plurality of transmitting nodes;
said network signature comprising a weighted summation of signals received at one receiving node from a plurality of receiving nodes from transmission from said one node from the plurality of transmitting nodes and signals received at said one receiving node from retransmission from other receiving node from said plurality of receiving nodes receiving transmission from said one node.

11. A method for transmitting information to a remote node in a network, the method comprising the steps of:
a) receiving, at each one of a plurality of receiving nodes the information transmitted from the at least one predetermined node;
b) determining at each one of the plurality of receiving nodes whether to retransmit the received information;
c) retransmitting, from each one of the plurality of receiving nodes, the received information, if retransmitting is determined;
d) receiving, at each one of another plurality of nodes in the network, a signal comprising a weighted summation of signals transmitted from said each node from the plurality of receiving nodes at which retransmitting was determined;
e) determining, at said each one of said another plurality of nodes, whether to retransmit the received signal;
f) retransmitting, from said each one of said another plurality of nodes, the received signal if retransmitting is determined; and,
receiving at the remote node the signals retransmitted from the another plurality of nodes.

12. The method of claim 11 where in the step of determining whether to retransmit comprises the steps of:
determining a pair wise symbol error probability for received signals at each one of the plurality of receiving nodes; and
determining at each one of plurality of receiving nodes whether the pair wise symbol probability satisfies a predetermined criterion.

13. The method of claim 11 where in the step of determining whether to retransmit comprises the steps of:
determining a signal to noise ratio for received signals at each one of the plurality of receiving nodes; and
determining at each one of plurality of receiving nodes whether the signal to noise ratio satisfies a predetermined criterion.

14. A system for transmitting information, the system comprising:
at least one transmitting node comprising a transmitter; and
a plurality of receiving nodes, each one node from said plurality of receiving nodes comprising:
a receiver;
means for determining whether to retransmit received signals/information; and
another transmitter;
each node from said plurality of receiving nodes being capable of retransmitting information received from said at least one transmitting node and also capable of retransmitting a signal comprising a weighted summation of signals received from other nodes from said plurality of receiving nodes; and
a remote node comprising a remote receiver;
wherein the system enables transmission to said remote node.

15. The system of claim 14 wherein said receiver is an adaptive receiver;
said adaptive receiver estimating network signatures.

16. The system of claim 15 wherein said adaptive receiver utilizes training for signal estimation.

17. The system of claim 15 wherein said adaptive receiver utilizes blind estimation for signal estimation.

18. The system of claim 15 wherein said determining means comprise:
means for determining a pair wise symbol error probability for received information at each one of the plurality of receiving nodes; and
means for determining at each one of plurality of receiving nodes whether the pair wise symbol probability satisfies a predetermined criterion.

19. The system of claim 15 wherein said determining means comprise:
means for determining a signal to noise ratio for received information at each one of the plurality of receiving nodes; and
means for determining at each one of plurality of receiving nodes whether the signal to noise ratio satisfies a predetermined criterion.

20. A method for transmitting information in a network, the method comprising the steps of:
transmitting information from each one of a plurality of predetermined nodes;
receiving at each one of a plurality of receiving nodes information transmitted from at least one of the plurality of predetermined nodes;
determining at each one of the plurality of receiving nodes whether to retransmit the received information;
determining at each one of the plurality of receiving nodes whether to retransmit the received information;
retransmitting, from each one of the plurality of receiving nodes, the received information, if retransmitting is determined;
receiving, at each one of another plurality of nodes in the network, information comprising a weighted summation of information transmitted from said each node from the plurality of receiving nodes at which retransmitting was determined;
determining, at said each one of said another plurality of nodes, whether to retransmit the received information; and
retransmitting, from said each one of said another plurality of nodes, the received information if retransmitting is determined;
whereby a physical layer flooding method is obtained.

21. The method of claim 20 where in the step of determining whether to retransmit comprises the steps of:
determining a pair wise symbol error probability for received information at each one of the plurality of receiving nodes; and
determining at each one of plurality of receiving nodes whether the pair wise symbol probability satisfies a predetermined criterion.

22. The method of claim 20 where in the step of determining whether to retransmit comprises the steps of:
determining a signal to noise ratio for received information at each one of the plurality of receiving nodes; and determining at each one of plurality of receiving nodes whether the signal to noise ratio satisfies a predetermined criterion.

23. A network for transmitting information, the network comprising:
a plurality of predetermined nodes, each one of said plurality of predetermined nodes comprising a transmitter; and
a plurality of receiving nodes, each one node from said plurality of receiving nodes comprising:
a receiver;
means for determining whether to retransmit received information; and
another transmitter;
each node from said plurality of receiving nodes being capable of retransmitting information received from at least one of said plurality of predetermined nodes and also capable of retransmitting information comprising a weighted summation of information received from other nodes from said plurality of receiving nodes;
whereby routing and multiple access overheads are not required.

24. The network of claim 23 wherein said receiver is an adaptive receiver.

25. The network of claim 24 wherein said adaptive receiver utilizes training for signal estimation.

26. The network of claim 24 wherein said adaptive receiver utilizes blind estimation for signal estimation.

27. The network of claim 25 wherein said adaptive receiver is trained to receive a plurality of signatures.

28. The network of claim 23 wherein said determining means comprise:
means for determining a pair wise symbol error probability for received information at each one of the plurality of receiving nodes; and
means for determining at each one of plurality of receiving nodes whether the pair wise symbol probability satisfies a predetermined criterion.

29. The network of claim 23 wherein said determining means comprise:
means for determining a signal to noise ratio for received information at each one of the plurality of receiving nodes; and
means for determining at each one of said plurality of receiving nodes whether the signal to noise ratio satisfies a predetermined criterion.

30. The network of claim 23 wherein each one of said plurality of predetermined nodes is capable of generating one signature from a plurality of signatures at a location of each of at least some of said plurality of receiving nodes.

31. The method of claim 1 wherein the step of determining whether to retransmit comprises the steps of:
determining whether energy of a received transmission exceeds a predetermined threshold.

32. The network of claim 5 wherein said determining means comprise:
means for determining whether energy of a received transmission exceeds a predetermined threshold.

33. The method of claim 11 wherein the step of determining whether to retransmit comprises the steps of:
determining whether energy of a received transmission exceeds a predetermined threshold.

34. The system of claim 15 wherein said determining means comprise:
means for determining whether energy of a received transmission exceeds a predetermined threshold.

35. The method of claim 1 further comprising the step of:
repeating steps d) through f);
whereby a physical layer flooding method is obtained.

36. The method of claim 11 further comprising the step of: repeating steps d) through f).

* * * * *